Figure 1:
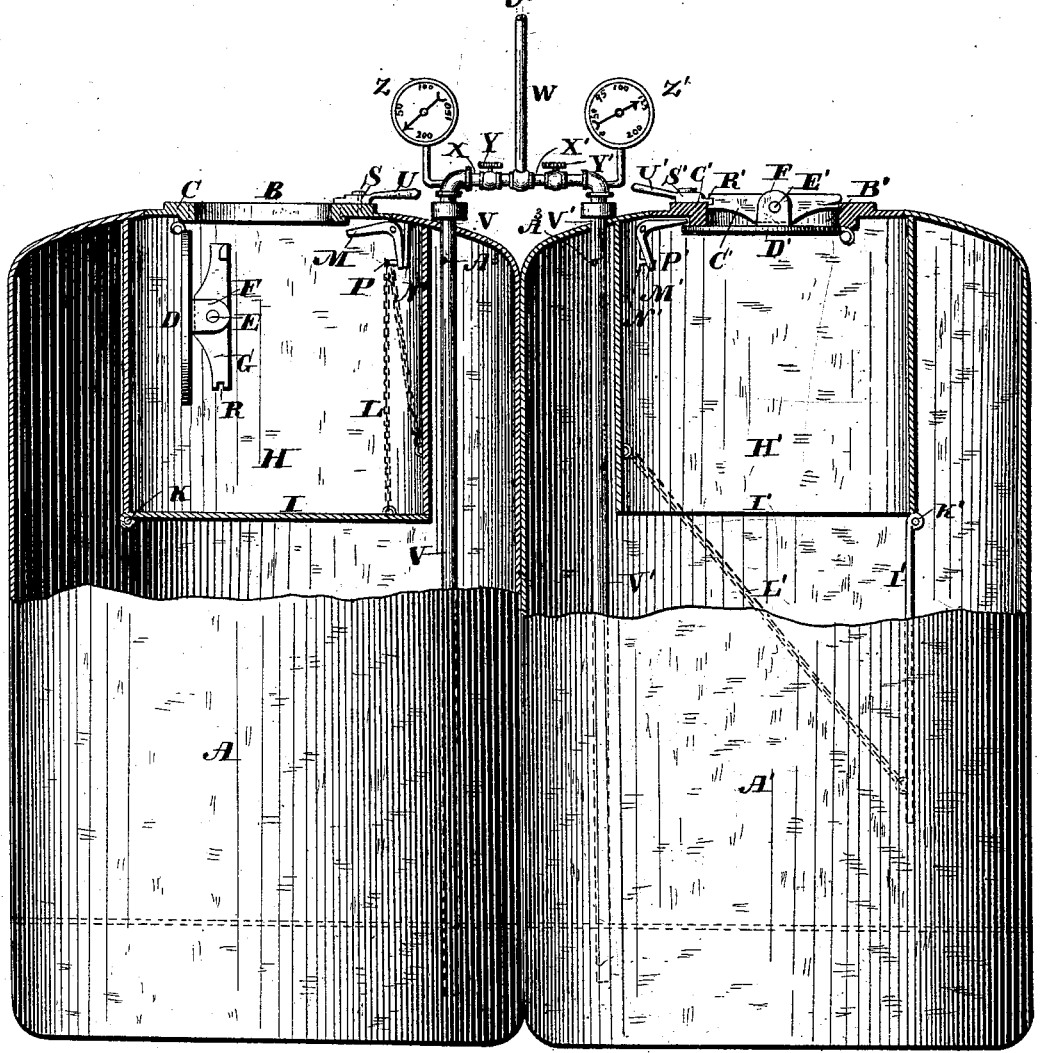

(No Model.) 2 Sheets—Sheet 1.

J. M. POLLARD.
Fire Extinguisher.

No. 237,900. Patented Feb. 15, 1881.

Attest:
J. Henry Kaiser
J. A. Rutherford

Inventor:
James M. Pollard
By James L. Norris
Attys (No Model.) 2 Sheets—Sheet 2.

J. M. POLLARD.
Fire Extinguisher.

No. 237,900. Patented Feb. 15, 1881.

Attest:
J. Henry Kaiser
J. A. Rutherford

Inventor.
James M Pollard
By James L. Norris
Atty.

UNITED STATES PATENT OFFICE.

JAMES M. POLLARD, OF NEW ORLEANS, LOUISIANA, ASSIGNOR TO GEORGE H. ROBINSON, IN TRUST FOR THE FIRE EXTINGUISHER MANUFACTURING COMPANY, OF NEW YORK, N. Y.

FIRE-EXTINGUISHER.

SPECIFICATION forming part of Letters Patent No. 237,900, dated February 15, 1881.

Application filed March 31, 1880. (No model.)

*To all whom it may concern:*

Be it known that I, JAMES MADISON POLLARD, a citizen of the United States, residing at New Orleans, in the parish of Orleans and State of Louisiana, have invented new and useful Improvements in Fire-Extinguishers, of which the following is a specification.

This invention relates to certain improvements in that class of fire-extinguishers in which sulphate of alumina is substituted for the free sulphuric acid as a reagent for decomposing a solution of carbonate of soda to generate carbonic-acid gas for the purpose of creating sufficient pressure in the generator to forcibly eject the solution with the carbonic-acid gas upon the fire; and it has for its object to provide a stationary apparatus consisting of one or more stationary tanks or generators, located at any convenient portion of a building or other structure, and connected with the different parts or apartments thereof by means of suitable connecting-pipes provided with suitable valves and connections, whereby the solution can be discharged upon the fire when desired.

My invention further has for its object to provide a means for rapidly charging and recharging the generators, and to automatically keep the pipes leading to the different parts of the building or structure free from the liquid while the generator is under pressure.

To this end the invention consists, first, in one or more vessels or tanks (two being generally employed for convenience in recharging) of sufficient strength to withstand the pressure of the gas developed within, and of proper size to contain the requisite charge, the two vessels or tanks being connected to a common discharge-pipe leading to the various parts of a building or other structure by means of suitable connecting-pipes provided with valves, whereby one of the vessels or tanks may serve as a reserve while recharging the other, as more fully hereinafter specified; second, in the combination, with the vessel or tank containing the solution under pressure, of an escape or discharge pipe provided with a small opening above the level of the liquid or solution in said vessel, whereby the system of pipes leading to the various parts of the building may be filled with gas as it is evolved in the vessel or tank, so as to exclude the solution from said pipes while the vessel or tank is under pressure, but permit the solution to readily and rapidly flow through said pipes when the pressure is removed to discharge the solution upon a fire, as more fully hereinafter set forth.

Figure 2:
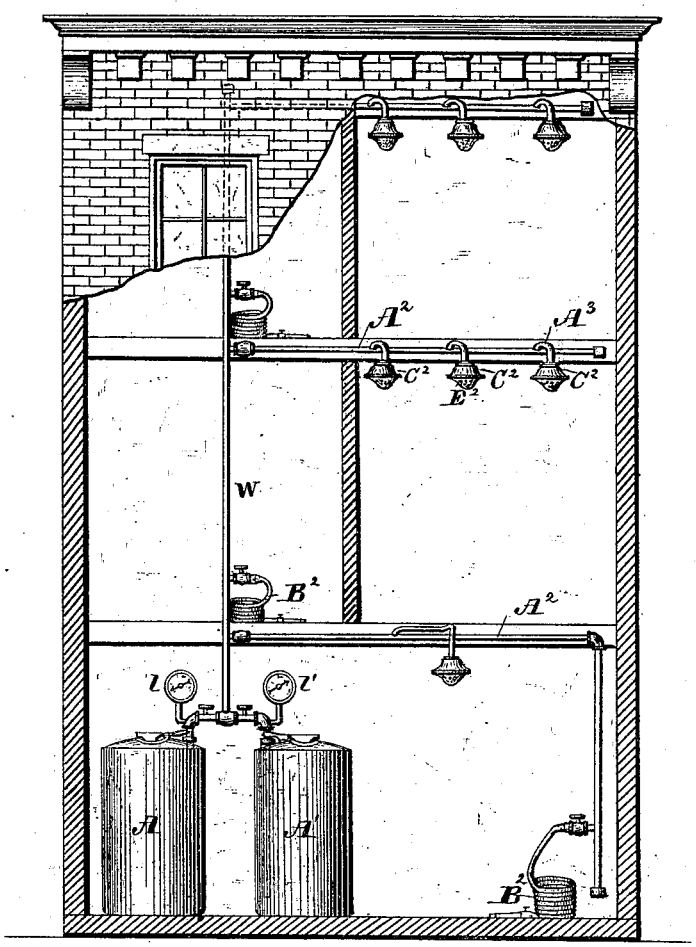
Figure 3:
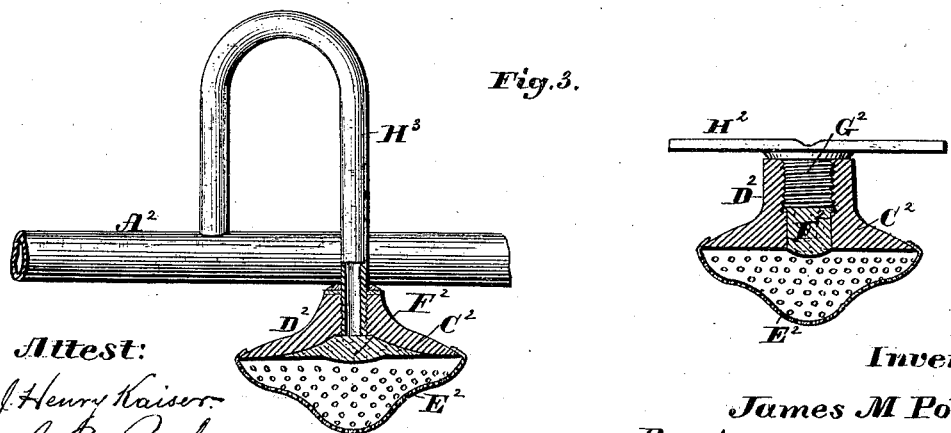

In the drawings, Figure 1 represents a vertical sectional view of my improved apparatus, showing two of the vessels or tanks, in one of which the parts are in position before mingling the chemicals, and the other in the position they assume when the vessel is charged with the chemicals mingled and under pressure. Fig. 2 represents a sectional view of a building with my invention arranged therein, and Fig. 3 represents detached sectional views of the devices to be applied to the terminals of the pipes in the respective compartments.

The letters A A' indicate the respective vessels or tanks, two being represented in the present instance, although one alone may be employed, or several, as may be desired. These vessels should be substantially identical in construction, and are of metal of sufficient strength to resist the pressure developed by the generation of the gas within the same. The said vessels or tanks are preferably in the form of vertical cylinders, and have openings or hand or man holes at their upper ends, (indicated, respectively, by the letters B B',) for access to the interior and the insertion of the charge. These openings are provided with annular seats (lettered C and C') in the respective vessels or tanks, against which are adapted to set the doors D D', which are provided with trunnions E E', which have bearings in the lugs F F' of the hinged bars G G', secured to the respective vessels in such manner that the said doors may open and close inwardly, as shown.

The letters H and H' indicate two cylindrical chambers, located one in each vessel or tank. The said chambers are open at their lower ends, and are provided with hinged doors or shelves I I', secured at the points K K' to the said lower ends, and adapted to open downwardly, as indicated in the drawings. To each door or shelf is secured one end of a loose chain (lettered L L') in the respective tanks, the other ends of said chains being secured to the inside of the respective chambers.

The letters M M' indicate two angle-levers, pivoted to hangers N N' in each vessel or tank, near the edge of the opening or hand or man hole in the same, on the opposite side to which the hinged doors are attached, for the purpose hereinafter explained. These hangers are provided with pins or hooks, (lettered P P',) to which the chains L L' may be secured to hold the doors or shelves in a closed position to receive the charge of bicarbonate of soda. The doors D D' are provided on their faces with gaskets or packings, in order to form a tight and secure joint with their seats when closed.

The letters S and S' indicate latch-disks, pivoted to the top of the vessels, and having projections at their edges in such manner that when the projections are in line with the slots R and R' the doors D and D' may be closed well up against their seats and secured by turning the disks, which is accomplished by means of the handles U and U'.

The letters V and V' indicate the discharge-tubes of the respective vessels, extending from the lower part of each vessel upward through the top of the same, and communicating with a common discharge-pipe, W, by means of the branches X X' in said tubes, having cut-off valves Y Y', by means of which either vessel can be thrown into communication with the discharge-tube W.

The letters Z and Z' indicate two pressure-gages, secured to the respective discharge-pipes X and X'.

The letter $A^3$ indicates a small opening in the pipes V and V' above the water-level in the respective vessels or tanks, the purpose of which is to permit the gas so generated to fill the pipes and exclude the solution in the generator from being forced into the same.

The letter $A^2$ indicates the pipes, forming a continuation of the discharge-pipe W, leading to the various rooms of the building or structure; and $B^2$, the hose-connections attached to said pipes, by means of which the liquid can be directed upon the fire wherever it occurs.

The letter $C^2$ indicates a device to be attached to the terminals of each branch pipe proceeding from the extinguisher to the various parts of the building, by means of which the said terminals of the pipes may be automatically unsealed by the action of the heat in case of fire, so as to discharge the solution and gas upon the fire. The said device consists of a section, $D^2$, provided with an internal screw-thread, by which it may be attached to the terminal of one of the branch pipes leading from the generators. The said section is provided with a perforated cap, $E^2$, which serves as a rose-jet to discharge the liquid upon the fire. The said section $D^2$ is provided with a plug or stopper, of fusible metal, as indicated by the letter $F^2$. The plug or stopper is first cast into proper shape, and to secure it in its seat it is first inserted therein and forcibly pressed home by means of a detachable screw, $G^2$, having operating-levers $H^2$. When firmly forced into place the whole is heated to melt the fusible plug and cause it to unite with its bearing or seat, after which the screw is removed and a coating of waterproof varnish applied to the plug, to insure a gas-tight joint between the same and its seat. The said device carrying the fusible plug is attached to the pipes extending through the building or structure by means of a bent or inverted-U-shaped connection, $H^3$, extending above the main pipe and downward below it, the sprinkling device being attached to the lower end of said connection.

No claim is here made to the fusible plug or cap in combination with the discharge-pipes.

The respective tanks are supplied with water up to or about the hinge of the doors I I', and into each tank is put a suitable quantity of sulphate of alumina—say one hundred pounds. The doors or shelves I I' are then raised by means of the chains, one link of each of which may be fastened to the pins P P' on the hangers N N', which carry the angle-levers M M'. A proper amount of bicarbonate of soda is then placed in the chambers—say fifty-six pounds in each—taking care that the same is spread away from the center, so that the door or hand or man hole cover can clear the same, and also that none of the chemicals or any other substance adheres to the gasket or packing. The openings are then closed by pulling up the door quickly. The edge of the door in raising will strike one end of the angle-lever, throwing the other end back, thus disengaging the chain, permitting the door or shelf to drop, and discharging its charge of carbonate of soda into the solution of sulphate of alumina below, thus instantly bringing together within the hermetically-closed vessels the chemical agents, immediately causing the generation of gas. When the generators are charged and the gas therein commences to be evolved, the gas will enter the pipes leading to the various parts of the building through the small openings in pipes V V', and prevent the solution from being forced into said pipes; but when any of the pipes are opened, in case of fire, relieving the tanks of pressure suddenly, owing to the difference in area between openings in the escape-pipes and the diameter of the same, the liquid will be rapidly forced through the said pipes to the desired point.

The inverted-U-shaped connections also serve to prevent the filling of such connections with liquid, as they are normally filled with gas, and any discharge of liquid or solution passing through the main pipes will be prevented from entering the bent pipes until the pressure is relieved in each.

What I claim is—

1. In an apparatus for generating gases under pressure for extinguishing fire, the combination of a vessel or tank for containing a reagent in solution and a chamber for containing a dry reagent, the said chamber being provided with a hinged door or shelf and retaining mechanism, whereby said door or shelf may be secured in position to hold the dry reagent, and mechanism for automatically releasing said door or shelf by the act of closing the vessel, substantially as specified.

2. In an apparatus for extinguishing fire, the combination of an exterior vessel for containing one reagent, and an interior chamber for containing another reagent, a hinged door or shelf secured to the lower end of said chamber, a loose connecting-chain attached to said door and to the interior of the chamber, a pin or hook adapted to engage the chain and secure the door in a closed position to hold the reagent, and a pivoted lever adapted to be operated by the door of the vessel in closing, to disengage the chain and drop the door or shelf at the lower end of the chamber, substantially as and for the purpose specified.

3. In combination with the stationary tanks of a fire-extinguisher, the eduction-pipes provided with openings above the water-level in said tanks, whereby the connections are kept normally filled with gas and the water or solution is excluded, substantially as specified.

In testimony whereof I have hereunto set my hand in the presence of two subscribing witnesses.

J. M. POLLARD.

Witnesses:
JAMES L. NORRIS,
JAMES A. RUTHERFORD.